United States Patent [19]

Takeuchi

[11] Patent Number: 4,611,490
[45] Date of Patent: Sep. 16, 1986

[54] ANGULAR ACCELERATION SENSOR

[75] Inventor: Kiyoshi Takeuchi, University Park, Pa.

[73] Assignee: Nissan Motor Co., Ltd., Yokohama, Japan

[21] Appl. No.: 654,389

[22] Filed: Sep. 26, 1984

[30] Foreign Application Priority Data

Sep. 29, 1983 [JP] Japan .................... 58-179333

[51] Int. Cl.⁴ .................................. G01P 15/09
[52] U.S. Cl. .................................. 73/505; 73/517 A
[58] Field of Search .................. 73/505, 510, 517 R, 73/517 A

[56] References Cited

U.S. PATENT DOCUMENTS 2,505,636  4/1950  Carter ............................... 73/505
3,295,377  1/1967  Richard ........................... 73/517 A
3,468,167  9/1969  Klass et al. ..................... 73/517 R

OTHER PUBLICATIONS

Journal of the Japan Society for Aeronautical and Space Sciences, vol. 30, No. 336 (Jan. 1982), 15-22, "Attitude Sensors".
General Electric pamphlet on VYRO (publication date unidentified).

*Primary Examiner*—Anthony V. Ciarlante
*Attorney, Agent, or Firm*—Leydig, Voit & Mayer, Ltd.

[57] ABSTRACT

A simple and shock-resistant device to measure angular acceleration about a predefined axis without using any spinning or vibrating mass. The device comprises a weight having a shape symmetrical with respect to an axis which becomes the aforementioned predefined axis, a stress transducer such as a piezoelectric element which is attached to the weight so as to have sensitivity to shear stress in a circumferential direction about the aforementioned axis, and a base member to which the assembly of the weight and the transducer is fixed such that at least a major portion of the weight is spaced from the base member. For example, the weight is a generally circular metal plate and the transducer is a ring-shaped element of a piezoelectric ceramic material having electrode films on the annular surfaces.

18 Claims, 13 Drawing Figures

FIG.11

| (1) CONSTRUCTION | (A) | (B) | (C) |
|---|---|---|---|
| (2) PIEZOELECTRIC EFFECT, USED | $d_{25}$ | $d_{16}$ | $d_{36}$ |
| (3) PIEZOELECTRIC EFFECT, UNNECESSARY | $d_{22}$ | $d_{11}$ | $d_{31}$ |

ANGULAR ACCELERATION SENSOR

BACKGROUND OF THE INVENTION

This invention relates to a device to measure angular acceleration about a predefined axis, the device being of the type having a weight and a stress transducer which are integrally fixed to a base member.

Angular velocity and angular acceleration sensors using gyroscopes are well known. However, for economical or other reasons the use of a gyroscopic instrument is not always favorable.

A recently developed device to measure angular velocity utilizes a vibratile metal bar instead of a spinning mass in a gyroscope. FIG. 1 of the accompanying drawings shows the principle of such a vibratory device. Use is made of a cross-sectionally rectangular bar 10 of a metal which is small in the expansion coefficient. On one side face, a piezoelectric element 12 for the exciting purpose is attached to the metal bar 10 with an adhesive. On the adjacent side face of the metal bar 10, another piezoelectric element 14 for the pick-up purpose is attached with an adhesive. The metal bar 10 is supported at two fulcrums 16 and 18 so that the first mode of vibration may be excited. The piezoelectric element 12 is excited by an oscillator 20 to keep the metal bar 10 vibrating in the X-Z plane. If angular velocity $\Omega$ about the axis Z is imparted to the vibrating metal bar 10, the Coriolis force acts on the vibrating portion of the bar 10 to result in excitation of vibration in the Y-Z plane, which is sensed by the piezoelectric element 14. Via an amplifier 22 the output of the piezoelectric element 14 is input to a phase detector 24, which performs phase discrimination by using the output of the oscillator 20 to thereby produce an output P representative of the angular velocity $\Omega$. The direction of the angular velocity $\Omega$ can be identified from the phase of the output P, and the magnitude of the angular velocity $\Omega$ can be known from the amplitude of the output P.

This vibratory device is simple in construction and will be high in reliability. However, this device suffers from low resolution because angular velocity about the axis Z does not smoothly transmit to the metal bar 10 which is supported at the nodes of vibration so as to freely vibrate. Furthermore, the supporting mechanism is not sufficiently resistant to shocks.

SUMMARY OF THE INVENTION

It is an object of the invention to provide a novel device to measure angular acceleration about a predefined axis, which device does not use any spinning mass and is simple in construction, high in sensitivity and resolution and highly resistant to mechanical shocks.

Essentially a device according to the invention is an assembly of a weight, which has a shape symmetrical with respect to an axis, and at least one transducer means for converting mechanical stress into electrical signal or optical signal attached to the weight with the aforementioned axis as the center axis of the assembly such that the transducer means has sensitivity to shear stress in a circumferential direction about the center axis. The assembly of the weight and the transducer means is fixed to a base member such that the center axis of the assembly can be brought into agreement with the aforementioned predefined axis and that at least a major portion of the weight is spaced from the base member.

A preferred example of the transducer means is a piezoelectric element, which may be of a popular piezoelectric ceramic material such as lead titanium zirconate (PZT) and which has a generally circular shape and is polarized in a circumferential direction and provided with at least one electrode in a plane normal to the center axis.

The assembling of the angular acceleration sensing device according to the invention, including the base member, can be done by using a bolt or the like or by using an adhesive. This device is very simple in construction. Because of the fixed arrangement of all the parts this device is highly resistant to mechanical shocks and has good durability, and angular acceleration of the base member transmits to the weight surely and smoothly. Under angular acceleration, the weight produces an inertia force so that a shear force acts on the transducer in a circumferential direction. Then the transducer develops an output signal representative of the direction and magnitude of the angular acceleration. By using a suitaly designed piezoelectric element, for example, it is possible to obtain an angular acceleration sensor high in sensitivity and resolution. Of course, an instrument to measure angular velocity can be produced by combining the angular acceleration sensor of the invention with a known electrical circuit including an integrator.

The transducer means in the present invention is not limited to piezoelectric elements. It is also possible to use a different kind of stress-sensitive element having directionality such as a magnetostriction element or an optical polarization element.

BRIEF DESCRIPTION OF THE DRAWINGS

FIG. 11 is a pictorial chart showing possible variations in the direction of polarization of a piezoelectric element in a sensor according to the invention and the arrangement of electrodes on the piezoelectric element in relation to the direction of polarization.

DESCRIPTION OF THE PREFERRED EMBODIMENTS

Figure 1:
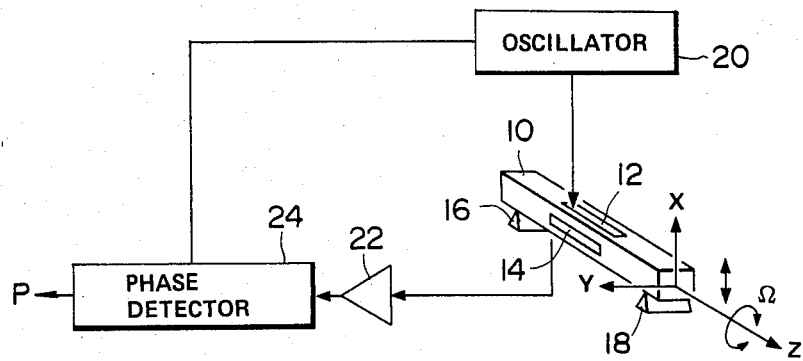
FIG. 1 is a perspective view of a known angular velocity sensor using a metal bar which is forced to vibrate.
Figure 2:
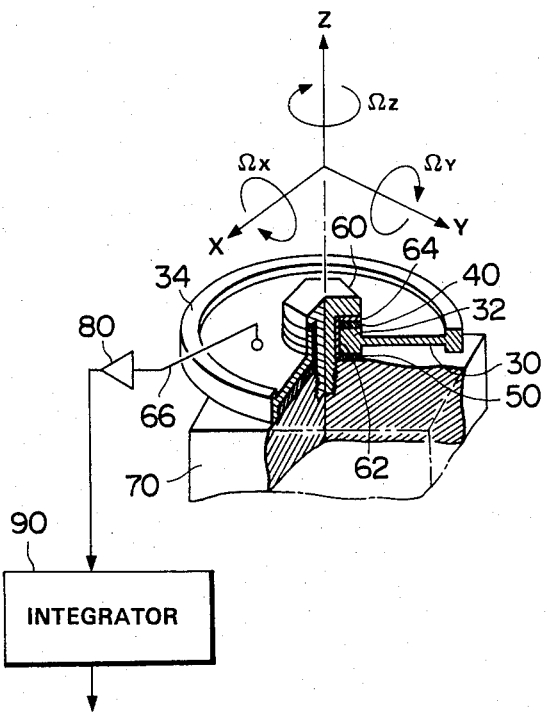
FIG. 2 is a perspective and partly sectional view of an angular acceleration sensor as an embodiment of the present invention.
Figure 3:
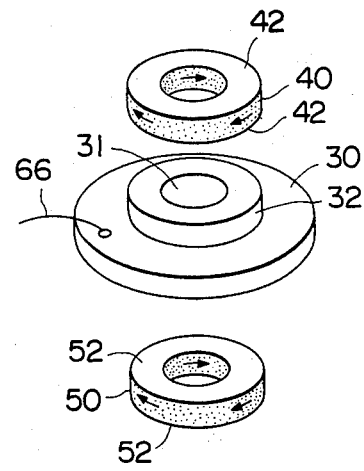
FIG. 3 shows the main parts of the angular acceleration sensor of FIG. 2 in an exploded view.

FIG. 2 shows a device to measure angular acceleration as a first embodiment of the invention, and FIG. 3 is an exploded view of the principal parts of the same device. Essentially this device is an assembly of a metal disc 30, which is employed as a weight having a shape symmetrical with respect to an axis Z, and two ring-shaped piezoelectric elements 40 and 50 coaxially placed on the upper and lower surfaces of the circular weight 30, respectively. The circular weight 30 is formed with a circular hole 31 in the center, a thickness increased portion 32 along the inner circumference and another thickness increased portion 34 (omitted from illustration in FIG. 3) along the outer circumference. A cylindrical tube 62 is inserted in the aligned center holes of the weight 30 and the two piezoelectric elements 40, 50 to keep these three parts in the coaxial arrangement, and these parts are tightly fixed to a base member 70 by means of a bolt 60 inserted in the tube 62 with interposal of a washer 64 between the upper piezoelectric element 40 and the head of the bolt 60. The piezoelectric element 50 interposed between the base member 70 and the weight 30, as well as the other piezoelectric element 40, is smaller in outer diameter than the weight 30 so that a major portion of the weight 30 is spaced from the base member 70.

The two piezoelectric elements 40 and 50 are of the same piezoelectric ceramic material such as PZT, and the two elements 40, 50 are polarized in the same circumferential direction as indicated by arrows in FIG. 3. The upper and lower surfaces of the piezoelectric element 40 are each coated with an electrode film 42, which is formed by applying and baking a conductive paint such as a silver paint. The upper and lower surfaces of the other piezoelectric element 50 are each coated with a similar electrode film 52. A lead wire 66 is connected to the metal weight 30 to transmit an output voltage, which is generated by the piezoelectric effect and represents angular acceleration which the base member 70 undergoes, to an integrator 90 via a charge amplifier 80. That is, the instrument of FIG. 2 as a whole serves as an angular velocity sensor. It is possible and rather advantageous to use an adhesive instead of the bolt 60 for fixing the piezoelectric elements 40, 50 to the weight 30 and the resultant assembly to the base member 70, because the reproducibility of shear force that appears between two adjacent parts is improved and consequently the output becomes stable.

In general a piezoelectric element develops an electric charge when a mechanical force acts thereon, but in the case of a steady force the developed charge leaks out rapidly. Therefore, piezoelectric elements are suitable for use in measuring a change of mechanical force or resultant acceleration or angular acceleration.

In FIG. 2 the axis Z agrees with the central axis of the acceleration sensitive device constructed of the weight 30 and the two piezoelectric elements 40 and 50, and axes X and Y are normal to the axis Z and also to each other. When the base member 70 has a motion in the direction of the axis X, Y or Z or an angular motion at an angular velocity $\Omega_X$ about the axis X, $\Omega_Y$ about the axis Y or $\Omega_Z$ about the axis Z, the device in FIG. 2 functions in such a manner as described below with reference to FIG. 4.

Figure 4:
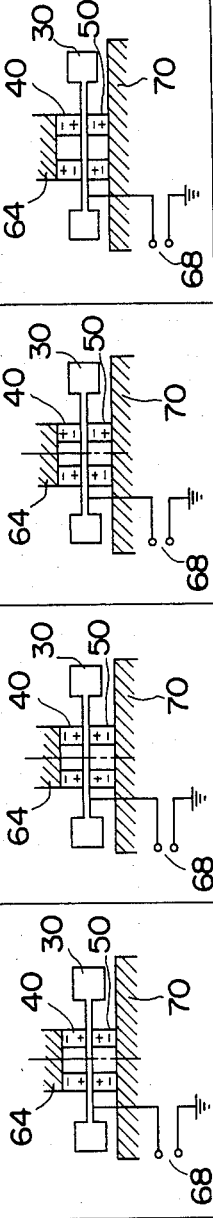
FIG. 4 is a pictorial chart showing the manners of response of the sensor of FIG. 2 to accelerations and angular accelerations in various directions.

In the pictorial chart of FIG. 4, column (A) shows the behavior of the device in FIG. 2 when the base member 70 is under acceleration in the direction Z, $d^2Z/dt^2$. In this case a force in the direction opposite to Z is produced since the weight 30 has an inertia so that a tensile force acts on the upper piezoelectric element 40 and a compressional force on the lower piezoelectric element 50. Therefore, electric charges are developed in the piezoelectric elements 40 and 50. Since the two piezoelectric elements 40 and 50 are polarized in the same circumferential direction, the polarity of the charge in the upper element 40 and the polarity of the charge in the lower element 50 are symmetrical with respect to the interposed weight 30 as shown at row (2) of column (A). Therefore, a potential which corresponds to the sum of the charge in the upper piezoelectric element 40 and the charge in the lower element 50 is obtained at an output terminal 68 to which the lead wire 66 extends from the weight 30. Since a force normal to the direction of polarization acts on each piezoelectric element 40, 50 and the developed charge is taken out in the direction of that force, the piezoelectric effect utilized in this case is the $d_{11}$ effect. In piezoelectric ceramics such as PZT the $d_{11}$ effect is very small, so that the output of the device at the terminal 68 is negligibly small even though the base member 70 is under acceleration $d^2Z/dt^2$ in the direction Z.

Column (B) of the chart of FIG. 4 shows a case where the base member 70 is under angular acceleration $d\Omega_Z/dt$ about the axis Z. In this case the weight 30 produces an inertia force in the direction opposite to the angular acceleration, so that a shear force in a circumferential direction acts on the upper piezoelectric element 40 and a shear force in the opposite circumferential direction on the lower piezoelectric element 50. The polarity of the charge developed in the upper element 40 and the polarity of the charge developed in the lower element 50 are symmetrical with respect to the interposed weight 30. Therefore, a potential which corresponds to the sum of the charges in the two piezoelectric elements 40 and 50 is obtained at the output terminal 68. Since a shear force in a direction concentrical with the direction of polarization acts on each piezoelectric element 40, 50 and the developed charge is taken out at the surface on which the shear force acts, the piezoelectric effect utilized in this case is the $d_{15}$ effect. The $d_{15}$ effect takes a relatively large value and has no connection with the pyroelectric effect (development of electric charge in a piezoelectric element when it undergoes a change in temperature) and, therefore, is suitable for use in detecting a slow change of a mechanical force with little influence of changes in the temperature. For these reasons, the device of FIG. 2 can detect angular acceleration about the axis Z with high sensitivity even when the magnitude of the angular acceleration is very small. In this device the weight 30 is so shaped as to become heavier in the outer peripheral portion so that the angular moment of the weight under angular acceleration of a given magnitude is relatively large. This is effective in further enhancing the sensitivity of the device.

Column (C) of the same chart shows a case where the base member 70 is under acceleration $d^2X/dt^2$ in the direction X or $d^2Y/dt^2$ in the direction Y. At the interfaces between the weight 30 and the respective piezoelectric elements 40, 50, the weight 30 provides an inertia force in the direction reverse to the direction of the acceleration. Accordingly a shear force acts on each piezoelectric element 40, 50. In this case two different types of piezoelectric effects are exhibited in different regions of each element 40, 50. In regions A and A', indicated at row (3), where the direction of the shear force is normal to the direction of polarization and the developed charge is taken out at the interface on which the shear force acts, the piezoelectric effect is the $d_{16}$ effect. In piezoelectric ceramics such as PZT, the $d_{16}$ effect is also very small. Besides, as indicated at row (2), the charges developed in the two opposite regions A and A' are reverse in polarity. Therefore, the $d_{16}$ effect does not appear as the output of the device of FIG. 2. In region B where the direction of the shear force is nearly concentrial with the direction of polarization, the piezoelectric effect is the $d_{15}$ effect as in the case of column (B). However, the $d_{15}$ effect in the region B is cancelled by the $d_{15}$ effect in region B' where the shear force acts in the opposite direction. Consequently the device of FIG. 2 produces no output in response to acceleration in the direction X or in the direction Y.

Column (D) of the same chart shows a case where the base member 70 is under angular acceleration $d\Omega_X/dt$ about the axis X or $d\Omega_Y/dt$ about the axis Y. In this case a compressional force acts on a certain portion of each piezoelectric element 40, 50 while a tensile force acts on a different portion of the same element 40, 50, as shown at row (3). In this case the piezoelectric effect is the $d_{11}$ effect which is very small as mentioned with respect to the case of column (A). Besides, the effect induced by the compressional force is cancelled by the effect induced in the same piezoelectric element by the tensile force. Therefore, the device of FIG. 2 produces no output in response to angular acceleration about the axis X or the axis Y.

Thus, the device of FIG. 2 is responsive to angular acceleration about the axis Z and also to acceleration in the direction Z, but the sensitivity to acceleration in the direction Z is negligibly small as described above. In a practical sense, therefore, this device has sensitivity only to angular acceleration about the axis Z, and the sensitivity in this case is very high. The direction of the angular acceleration $d\Omega_Z/dt$ can be identified from the polarity of the output voltage, and the magnitude of the angular acceleration can be known from the amplitude of the output. Of course it is possible to obtain an output of reverse polarity by reversing the direction of polarization of the piezoelectric elements 40 and 50.

Figure 5:
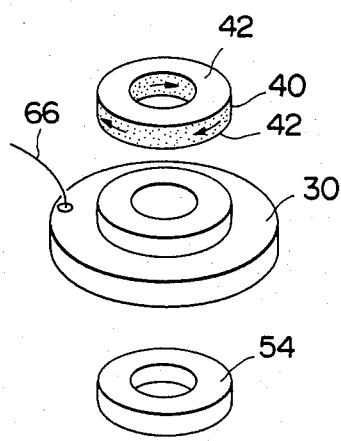
FIG. 5 is an exploded view of the main parts of another embodiment of the invention.

FIG. 5 shows a second embodiment of the invention. In short, the device of FIG. 5 results from the deletion of the lower piezoelectric element 50 from the device of FIG. 2. As will be understood from the explanation with reference to FIG. 4, the function of either the upper element 40 or the lower element 50 is sufficient to the performance of the angular acceleration sensor of FIG. 2. The omission of one piezoelectric element is very favorable for reduction of the production cost and leads to a considerable reduction in the size of the device. In the case of the device of FIG. 5 an insulating washer 54 must be interposed between the weight 30 and the base member 70 (not shown in FIG. 5) because the weight 30 is used as an electrode also in this case.

Figure 6:
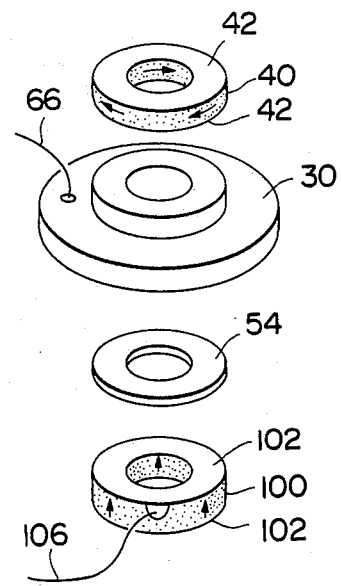
FIG. 6 is an exploded view of the main parts of a still different embodiment of the invention.

FIG. 6 shows a third embodiment of the invention. Essentially, this device is an assembly of a circular weight 30 and two ring-shaped piezoelectric elements 40 and 100 coaxially placed on the upper and lower surfaces of the weight 30, respectively, with interposal of an insulating washer 54 between the weight 30 and the lower piezoelectric element 100. The upper piezoelectric element 40 is identical with the element 40 in the device of FIG. 2. The lower element 100 is of the same piezoelectric ceramic material as the upper element 40, and this element 100 is polarized in the direction Z. The upper and lower surfaces of the piezoelectric element 100 are each coated with an electrode film 102, and a lead wire is connected to the upper electrode film 102. The assembly of the parts shown in FIG. 6 is fixed to the base member 70 shown in FIG. 2 in the same manner as in the case of the device of FIG. 2.

The piezoelectric effect utilized in the lower element 100 is the $d_{33}$ effect, so that this element 100 exhibits sensitivity only to acceleration in the direction Z. When the base member is under angular acceleration about the axis Z the device of FIG. 6 produces an output by the function of the upper piezoelectric element 40, and the output is taken out via the lead wire 66 connected to the weight 30. When the base member is under acceleration in the direction Z the same device produces an output by the function of the lower piezoelectric element 100, and the output is taken out via the lead wire 106. Thus, the device of FIG. 6 serves as both an acceleration sensor and an angular acceleration sensor. If desired, it is possible to render the piezoelectric element 100 responsive to acceleration in the direction X or Y too by using a different polarizing method to thereby obtain a multidimensional accelerometer which has only one weight 30.

Figure 7:
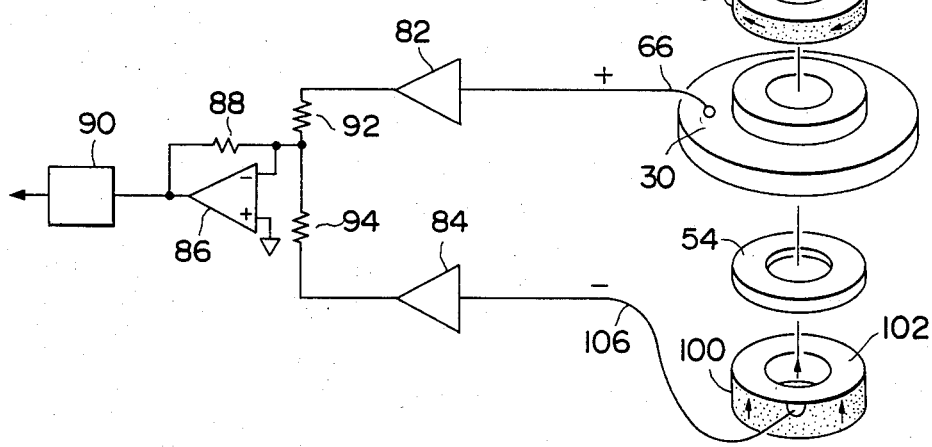
FIG. 7 shows, partly as a circuit diagram, a device to measure angular velocity using the angular acceleration sensor of FIG. 6.

FIG. 7 shows an angular velocity measuring instrument in which the device of FIG. 6 is used.

The lead wire 66 extending from the weight 30 (which is electrically connected to the upper piezoelectric element 40) is connected to a charge amplifier 82, and the lead wire extending from the lower piezoelectric element 100 is connected to another charge amplifier 84. The outputs of the two charge amplifiers 82 and 84 are input to an adder 86, which is an operational amplifier provided with a feedback resistance 88, via resistances 92 and 94, respectively. The output of the adder 86 is input to an integrator 90. The instrument of FIG. 7 is used to measure angular velocity about the axis Z by using the device of FIG. 6 as an angular acceleration sensor. Accordingly the principal element is the circumferentially polarized piezoelectric element 40. However, the output of this piezoelectric element 40 includes a component of acceleration in the direction Z though this component is very small. To completely eliminate this acceleration component, use is made of the output of the other piezoelectric element 100. This element 100 provides a negative output voltage which represents acceleration in the direction Z owing to the $p_{33}$ effect, whereas the output of the piezoelectric element 40 attributed to the $d_{11}$ effect in response to acceleration in the direction Z is a positive voltage. Therefore, the acceleration component of the output of the element 40 treated by the charge amplifier 82 can be cancelled by adding thereto the reverse phase output of the other element 100 treated in the charge amplifier 84 after proper weighting of the respective outputs by the resistances 92 and 94 having different resistance values. As a result, the input to the integrator 90 is always a pure angular acceleration signal so that the instrument of FIG. 7 can accurately measure angular velocity about the axis Z even though the piezoelectric element 40 has slight sensitivity to acceleration in the direction Z.

Figure 8:
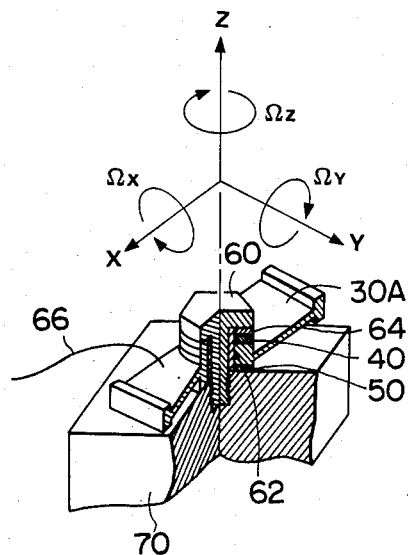
FIG. 8 is a perspective and partly sectional view of an angular acceleration sensor which is similar in principle to the sensor of FIG. 2 but different in design.

FIG. 8 shows a modification of the angular acceleration sensor in FIG. 2. In place of the circular weight 30 in FIG. 2, the angular acceleration sensor of FIG. 8 has a weight 30A which consists of an annular and relatively small central portion and two generally trapezoidal portions oppositely extending from the central portion with the longer base of each trapezoidal portion on the outer side. As can be seen in FIG. 8, the shape of this weight 30A too is symmetrical with respect to the axis Z. The essential requirements for the weight in a device according to the invention are to have sufficient inertia and to produce angular moment. Therefore, the weight need not be circular as a whole and may have any shape that is symmetrical with respect to a predefined axis. The overall size of the device can be reduced by designing the weight in the manner as shown in FIG. 8 or analogously. In other respects, the angular acceleration sensor of FIG. 8 is of the same construction as the sensor of FIG. 2.

Figure 9:
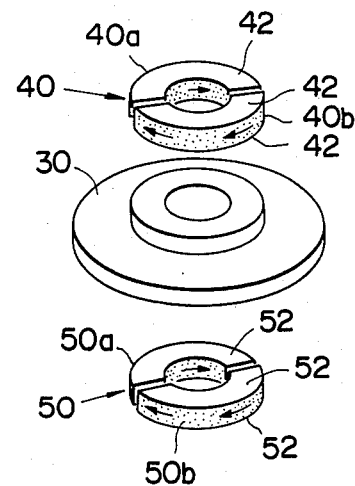
FIG. 9 is an exploded view of the main parts of a still different embodiment of the invention.

FIG. 9 shows another modification of the angular acceleration sensor of FIGS. 2 and 3. The modification resides in that the upper ring-shaped piezoelectric element 40 in FIGS. 2 and 3 is divided into two semi-annular piezoelectric elements 40a and 40b and that the lower ring-shaped piezoelectric element 50 in FIGS. 2 and 3 is also divided into two semi-annular piezoelectric elements 50a and 50b. The upper and lower surfaces of each semi-annular element 40a, 40b, 50a, 50b are each coated with the electrode film 42 or 52 described hereinbefore with respect to the elements 40, 50 in FIG. 3. This modification is made because it is not easy to polarize the ring-shaped piezoelectric elements 40, 50 in the circumferential direction. Each of the semi-annular piezoelectric elements 40a, 40b, 50a, 50b in FIG. 9 can be polarized in the circumferential direction by the following method.

Figure 10A:
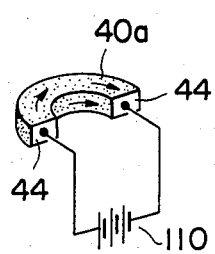
FIGS. 10(A) to 10(C) illustrate a process of producing an piezoelectric element used in the sensor of FIG. 9.
Figure 10B:
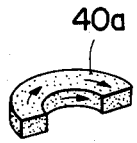
Figure 10C:
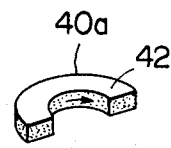

Referring to FIG. 10(A), initially the two rectangular side faces of the semi-annular element 40a (as the representative of the four semi-annular elements in FIG. 9), i.e. side faces appeared by cutting an annular element into two halves, are each coated with an electrodes film 44 using a silver paint, for example. Using the electrode films 44 on the two side faces, a high voltage is applied to the semi-annular piezoelectric element 40a from an external power source 110 so as to accomplish poling in the circumferential direction as indicated by arrows in FIG. 10(A). After that, the electrode films 44 are removed as shown in FIG. 10(B) by using a suitable chemical such as nitric acid. Next, as shown in FIG. 10(C), the upper and lower surfaces of the semi-annular element 40a are each coated with the electrode film 42. In this case it is unsuitable to finish the electrode films 42 by high temperature baking because the polarization will be lost by the influence of the high temperature. Accordingly it is better to form the electrode films 42 by a method not having a baking step, such as the application of a conductive adhesive. It is possible to assemble the parts shown in FIG. 9 into the angular acceleration sensor by using a conductive adhesive. In such a case the electrode-forming step of FIG. 10(C) and the assembling step can be accomplished simultaneously.

In the above described embodiments of the invention, the piezoelectric elements are polarized in the circumferential direction, and each electrodes of each piezoelectric element lies in a plane normal to the axis Z to thereby efficiently utilize the piezoelectric characteristics of popular piezoelectric ceramics such as PZT which are large in the $d_{15}$ effect and small in the $d_{11}$ effect.

In the present invention it is also possible to use a different type of piezoelectric ceramic material or a piezoelectric crystal or a piezoelectric polymer. In such a case, the direction of polarization of the piezoelectric element and the arrangement of the electrodes may be altered so as to utilize a particular piezoelectric effect of the employed material which provides high sensitivity to angular acceleration about a predefined axis. For example, the direction of polarization and the arrangement of the electrodes may be altered in the manners as shown in FIG. 11 with respect to the sensor construction of FIGS. 2 and 3.

In the pictorial chart of FIG. 11, column (A) shows a case where the employed piezoelectric material is large in the $d_{25}$ effect. In this case the two ring-shaped piezoelectric elements 40A and 50A are polarized in the same circumferential direction. The upper piezoelectric element 40A has a circumferential electrode film 46 on the outer side face and a plurality of small electrodes 48 each of which is in the form of film and extends from the circumferential electrode 46 across the outer edge of the element 40A so as to cover a small area of the upper surface. The other element 50A has a circumferential electrode film 56 and a plurality of small electrodes 58 each of which lies across the inner and upper edge of the element 50A so as to cover a small area of the upper surface and a small area of the inner side face of the element 50A. The electrodes 48 and 58 formed in the edge regions of the respective elements 40A and 50A are for the purpose of conducting the outputs of the respective elements 40A, 50A in the axial direction. In this case the $d_{22}$ effect of the piezoelectric material is unnecessary.

Column (B) of the same chart shows a case where the employed piezoelectric material is large in the $d_{16}$ effect. In this case the two ring-shaped piezoelectric elements 40B and 50B are polarized radially as indicated by arrows. The upper and lower surfaces of the piezoelectric element 40B are each coated with an electrode film 42. Similarly the upper and lower surfaces of the other element 50B are each coated with an electrode film 52. In this case the $d_{11}$ effect of the piezoelectric material is unnecessary.

Column (C) of the chart shows a case where the employed piezoelectric material is large in the $d_{36}$ effect. The two ring-shaped piezoelectric elements 40C and 50C are polarized radially. The upper piezoelectric element 40C has the circumferential electrode film 46 and the small edge electrodes 48 similarly to the element 40A in column (A). The other elements 50C has the circumferential electrode film 56 and the small edge electrodes 58 similarly to the element 50A in column (A). In this case the $d_{31}$ effect of the piezoelectric material is unnecessary.

I claim:

1. A device to measure angular acceleration about a predefined axis, the device comprising:
    a weight which has a shape symmetrical with respect to an axis;
    transducer means for converting mechanical stress into an angular acceleration representing signal, said transducer means being attached to said weight with said axis as the center axis of a resultant assembly, and said transducer means having directional sensitivity to shear stress in a circumferential direction about said axis; and
    a base member to which said assembly is fixed with said transducer means between a surface of said weight and a surface associated with said base member and sensitive to shear stress between said surfaces and such that said center axis of said assembly can be brought into agreement with said predefined axis and that at least a major portion of said wight is spaced from said base member.

2. A device according to claim 1, wherein said transducer means comprises a piezoelectric element which has a generally circular shape and is polarized in a circumferential direction about said center axis, said piezoelectric element having at least one electrode in a plane normal to said center axis.

3. A device according to claim 2, wherein said piezoelectric element comprises a generally circular body of a piezoelectric ceramic material.

4. A device according to claim 3, wherein said piezoelectric ceramic material is lead titanium zirconate.

5. A device according to claim 2, wherein said piezoelectric element comprises a generally ring-shaped body of a piezoelectric material and two electrode films formed on the two opposite annular surfaces of said body, respectively.

6. A device according to claim 2, wherein said piezoelectric element comprises two generally semi-annular bodies of a piezoelectric material which are arranged so as to provide a ring-like configuration, each generally semi-annular surface of each of said bodies being coated with an electrode film.

7. A device according to claim 2, further comprising another piezoelectric element which is substantially identical with said piezoelectric element, said piezoelectric element and said another piezoelectric element being coaxially attached to two opposite sides of said weight, respectively.

8. A device according to claim 2, further comprising another piezoelectric element which has a generally circular shape and is polarized in a direction parallel to the center axis thereof such that said another piezoelectric element has sensitivity to tensile or compressional stress in a direction parallel to said center axis, said another piezoelectric element comprising at least one electrode in a plane normal to the center axis thereof, said piezoelectric element and said another piezoelectric element being coaxially mounted on two opposite sides of said weight, respectively.

9. A device according to claim 1, wherein said weight is in the form of a generally circular plate.

10. A device according to claim 1, wherein said weight is in the form of a plate consisting of a generally circular and relatively small central portion and two generally quadrilateral portions which are symmetrical with each other and oppositely extend from said central portion.

11. A device according to claim 1, wherein said transducer means has sensitivity also to tensile or compressional stress in a direction parallel to said axis, the device further comprising another transducer means for converting mechanical stress into an acceleration representing signal, said another transducer means being attached to said weight such that said another transducer means has sensitivity to said tensile or compressional stress and that the output of said another transducer means becomes reverse to a tensile or compressional component of the output of said transducer means.

12. A device to measure angular acceleration about a predefined axis, the device comprising:
an electrically conductive weight which is in the form of a plate having a shape symmetrical with respect to an axis normal to said plate;
a piezoelectric element which comprises a ring-shaped body of a piezoelectric ceramic material polarized in a circumferential direction and two electrode films formed on two opposite annular surfaces of said body, respectively, said piezoelectric element being attached to said weight with said axis in agreement with the center axis of said body such that said piezoelectric element has sensitivity to shear stress in a circumferential direction about said axis; and
a base member to which the assembly of said weight and said piezoelectric element is fixed such that said axis can be brought into agreement with said predefined axis and that at least a major portion of said weight is spaced from said base member.

13. A device according to claim 12, further comprising another piezoelectric element which is substantially identical with said piezoelectric element, said piezoelectric element and said another piezoelectric element being coaxially attached to the two opposite sides of said weight, respectively.

14. A device according to claim 12, wherein said ring-shaped body is an assembly of two semi-annular bodies.

15. A device according to claim 12, further comprising another piezoelectric element which comprises a ring-shaped body of a piezoelectric ceramic material polarized in a direction parallel to the center axis thereof and two electrode films formed on the two opposite annular surfaces of the ring-shaped body, respectively, said another piezoelectric element being fixedly interposed between said weight and said base member coaxially with said piezoelectric element, the device further comprising an insulating plate which is tightly inserted between said weight and said another piezoelectric element.

16. A device according to claim 12, wherein said weight and said piezoelectric element are fixed to each other and also to said base member by a mechanical fastening means.

17. A device according to claim 12, wherein said weight and said piezoelectric element are fixed to each other and also to said base member with an adhesive.

18. An apparatus to measure angular velocity about a predefined axis, the apparatus comprising:
an angular acceleration sensing device which comprises a weight having a shape symmetrical with respect to an axis, a transducer means for converting mechanical stress into electrical signal, said transducer means being attached to said weight with said axis as the center axis of a resultant assembly, and said transducer means having directional sensitivity to shear stress in a circumferential direction about said axis, and a base member to which said assembly is fixed with said transducer means between a surface of said weight and a surface associated with said base member and sensitive to shear stress between said surfaces and such that said center axis can be brought into agreement with said predefined axis and that at least a major portion of said weight is spaced from said base member; and
an electrical circuit comprising means for integrating the output of said angular acceleration sensing device with respect to time.

* * * * *